(12) United States Patent
Garcia Reyero Viñas et al.

(10) Patent No.: US 10,516,806 B2
(45) Date of Patent: Dec. 24, 2019

(54) PROCESSING COLOR IMAGE OF FIRST COLOR SPACE INTO RENDERABLE IMAGE OF SECOND COLOR SPACE

(71) Applicant: Hewlett-Packard Development Company, L.P., Houston, TX (US)

(72) Inventors: Juan Manuel Garcia Reyero Viñas, Sant Cugat del Valles (ES); Paolo Faraboschi, Palo Alto, CA (US); Jan Morovic, Colchester (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 955 days.

(21) Appl. No.: 14/899,665

(22) PCT Filed: Jun. 28, 2013

(86) PCT No.: PCT/EP2013/063604
§ 371 (c)(1),
(2) Date: Dec. 18, 2015

(87) PCT Pub. No.: WO2014/206480
PCT Pub. Date: Dec. 31, 2014

(65) Prior Publication Data
US 2016/0173732 A1  Jun. 16, 2016

(51) Int. Cl.
*H04N 1/60* (2006.01)
*H04N 1/52* (2006.01)
*H04N 1/54* (2006.01)

(52) U.S. Cl.
CPC ............. *H04N 1/52* (2013.01); *H04N 1/6019* (2013.01); *H04N 1/54* (2013.01)

(58) Field of Classification Search
USPC .................. 358/1.9, 3.06–3.23, 518
See application file for complete search history.

(56) References Cited

U.S. PATENT DOCUMENTS 6,246,396 B1   6/2001   Gibson et al.
6,765,695 B2   7/2004   Chen et al.
(Continued)

OTHER PUBLICATIONS

Chandu, K. et al.,"A GPU Implementation of Color Digital Halftoning Using the Direct Binary Search Algorithm," International Symposium on Circuits and Systems, May 20-23, 2012, pp. 185-188.
(Continued)

*Primary Examiner* — Dung D Tran
(74) *Attorney, Agent, or Firm* — HP Inc. Patent Department

(57) ABSTRACT

A color image is processed into a renderable image. The color image comprises a plurality of pixels. Each pixel has colorimetry defined in a first color space. The renderable image comprises a plurality of renderable pixels defined by a device-vector in a second color space. For each pixel: a device-vector defined in the second color space is selected (301) based on the colorimetry defined in a first color space of the pixel. The device-vector comprises a plurality of elements. Each element includes an identifier and an accumulated weighting. An element of the selected device-vector is reselected (303) until the accumulated weighting (a) is greater than a threshold value (t) associated with the pixel (305). The levels for each color of the second color space (or mappings) for the currently selected (307) element of the selected device-vector is determined (309) to convert the pixel into a renderable pixel.

20 Claims, 7 Drawing Sheets

(56) References Cited

U.S. PATENT DOCUMENTS

| | | |
|---|---|---|
| 7,054,035 B2 * | 5/2006 | Zeng ............... H04N 1/603 |
| | | 345/601 |
| 7,054,038 B1 | 5/2006 | Ostromoukhov et al. |
| 7,489,815 B2 * | 2/2009 | Haikin ............ H04N 1/6022 |
| | | 358/518 |
| 7,684,084 B2 | 3/2010 | Fan et al. |
| 9,008,363 B1 * | 4/2015 | Klier ................ G06T 7/269 |
| | | 382/103 |
| 9,591,187 B2 * | 3/2017 | Martinez de Salinas Vazquez ..... |
| | | G06K 15/1878 |
| 2005/0237545 A1 * | 10/2005 | Boll ................. H04N 1/6058 |
| | | 358/1.9 |
| 2010/0214576 A1 | 8/2010 | Morovic et al. |
| 2011/0074990 A1 * | 3/2011 | Shiohara .......... G03B 17/18 |
| | | 348/273 |
| 2012/0086721 A1 | 4/2012 | Morovic et al. |

OTHER PUBLICATIONS

Fairchild, M.D. et al., "Accurate color reproduction of CRT-displayed images as projected 35-mm slides." Journal of Electronic Imaging vol. 5, No. 1, Mar. 18, 1995, pp. 87-96.

Morovic, J., et al., "Hans—A New Color Separation and Halftoning Paradigm", 18th Color and Imaging Conference, Jan. 1, 2010, pp. 359-364.

PCT International Search Report and Written Opinion, Mar. 4, 2014, PCT Application No. PCT/EP2013/063604, European Patent Office, 12 pages.

\* cited by examiner

PROCESSING COLOR IMAGE OF FIRST COLOR SPACE INTO RENDERABLE IMAGE OF SECOND COLOR SPACE

CROSS-REFERENCE TO RELATED APPLICATION

This application is a U.S. National Stage Application of and claims priority to International Patent Application No. PCT/EP2013/063604, filed on Jun. 28, 2013, and entitled "COLOR IMAGE PROCESSING," which is hereby incorporated by reference in its entirety.

BACKGROUND TO THE INVENTION

Color image processing to convert an image into a renderable image, that is an image capable of being rendered, invariably involves some form of color and data transformation to convert the pixels of the color image having colorimetry defined in a first color space into a renderable image comprising a plurality of renderable pixels, that is a pixel capable of being rendered, defined by a device in a second color space of the rendering device. This color image processing may require high data rates, for example, data rates in the range of 100 Mpix/s to 2 Gpix/s. There exists many ways of achieving these data rates. One way is to utilise a high-end server with the rendering device and another is to implement the image processing pipeline in an Application Specific Integrated Circuit (ASIC) or a Field-Programmable Gate Array (FPGA). The former approach greatly increases the costs of the rendering device to the point of making them unviable. The latter approach, pipeline on an ASIC or FPGA, lacks flexibility. An ASIC's development process, for example, is slow, the algorithms to implement have to be decided well in advance, and frequently several different models of the rendering device have to share an ASIC in order to reach the volumes that make it cost-effective.

BRIEF DESCRIPTION OF DRAWINGS

For a more complete understanding, reference is now made to the following description taken in conjunction with the accompanying drawings in which.

DETAILED DESCRIPTION

Rendering devices, such as printers, implement some data transformation that converts pixels in RGB (or in any other color space) to drops of ink for printed objects of a given colorimetry. High-end printers, for example, require image processing at large data rates, for example, in the range 100 Mpix/s to 2 Gpix/s.

Although the description below describes an implementation of image processing in a printing system, it can be appreciated that the color processing is equally applicable to render on a screen, or any other media.

Figure 1:
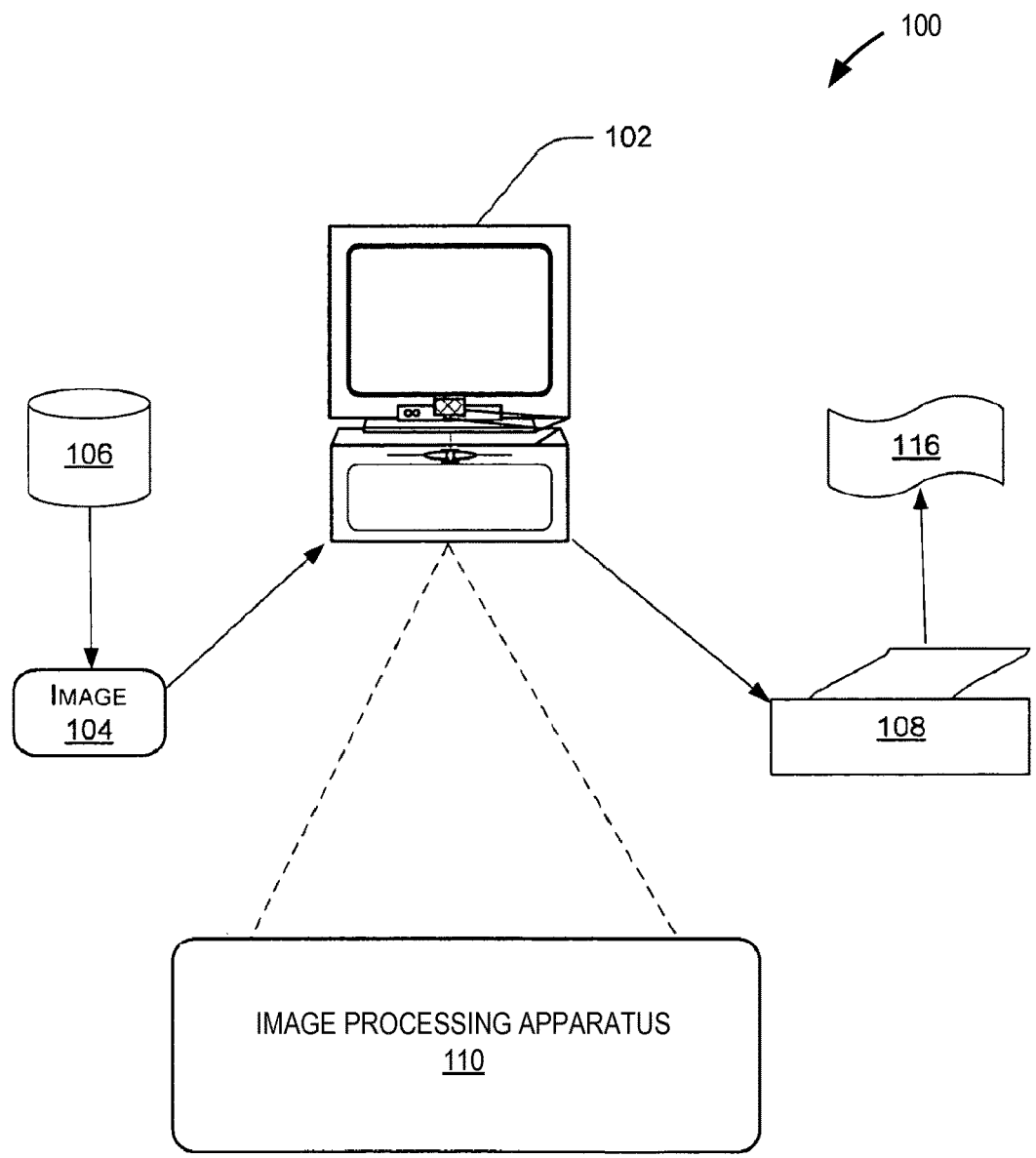
FIG. 1 is a simplified schematic diagram of a color printing system according to an example.

FIG. 1 illustrates an example of a printing system 100 including image processing apparatus. Printing system 100 can be implemented, at least in part, by one or more suitable computing devices, such as computing device 102. Other computing devices that may be used include, but are not limited to, a personal computer, a laptop computer, a desktop computer, a digital camera, a personal digital assistance device, a cellular phone, a video player, and other types of image sources.

In one implementation, an image 104 is uploaded to the computing device 102 using input device 106. In other implementations, the image may be retrieved from a previously generated image set contained on a storage media, or retrieved from a remote storage location, such as an online application, using the Internet. Image 104 may be a still digital image created by a digital camera, a scanner, or the like. In other implementations the image may be a moving image such as a digital video. Image 104 may be sent to an output device such as printing device 108 by the computing device 102. Other printing devices that may be used include, but are not limited to, a dot-matrix printer, an inkjet printer, a laser printer, line printer, a solid ink printer, and any other kind of digital printer. In other implementations, the image may be displayed to a user on an output device 108 including, but not limited to, a TV set of various technologies (Cathode Ray Tube, Liquid Crystal Display, plasma), a computer display, a mobile phone display, a video projector, a multicolor Light Emitting Diode display, and the like.

In one implementation, the printing system 100 comprises image processing apparatus 110. The image processing apparatus 110 may be integral with the computing device 102 or the printing device 108. The image processing apparatus may utilise Halftone Area Neugebauer Separation (HANS) techniques to process the input image 104 into a printable format. Firstly, the input pixels, typically in an RGB color space, are transformed to a space that reflects the printer's primary printing capabilities, typically levels for each ink on a 0 to 255 scale. Next, the input pixels are subjected to halftoning which comprises a mapping of how many dots to fire, if any, for each pixel for each ink.

Figure 2:
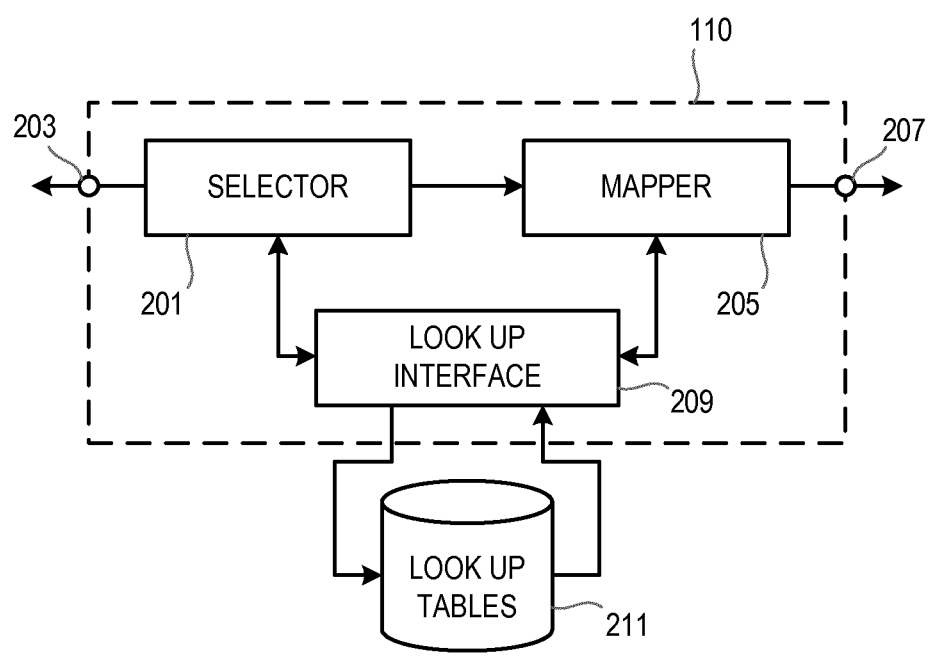
FIG. 2 is a simplified schematic diagram of an apparatus for processing a color image data according to an example.

The apparatus 110 for processing a color input image, as shown in FIG. 2, comprises a selector 201 having an input connected to the input terminal 203 of the apparatus 110. The selector 201 is connected to a mapper 205. The output of the mapper 205 is connected to an output terminal 207 of the apparatus 110. The selector 201 and the mapper 205 are connected to a look-up interface 209. The look-up interface 209 is connected to a storage device 211 storing at least one look-up table. The storage device 211 may be integral with the apparatus 110 or external thereto.

Operation of the apparatus 110 will now be described with reference to FIG. 3. An input color image 104 comprising a plurality of pixels, each having a colorimetry defined in a first color space, for example, RGB color space, is received by the selector 201 via the input terminal 203. The selector 201 is configured, for each pixel, to select, 301, a device-vector (e.g. an ink-vector) defined in a second color space, for example CMYK color space, based on the colorimetry of the pixel of the input color image 104. The ink-vector comprises a plurality of elements. Each element includes an identifier and an accumulated weighting. An element of the selected ink-vector is reselected, 303, until the accumulated weighting value of the currently selected ink-vector element is greater than a threshold value associated with the pixel, 305. The current ink-vector element is selected, 307, by the selector 201 for the mapper 205. The mapper 205 is configured to determine, 309, the levels (mappings) for each color of the second color space of the currently selected element of the selected ink-vector. The mapping is output on the output terminal 207 and provided to the printer 106 to control the ink drops for printing the input color image 104.

The color transformation can be defined by a 3D look-up table (LUT). The color transformation is usually sampled at 17 values per dimension, so it has $17^3$ entries.

Each entry contains an output-space vector. The definition of the LUT affects several printer characteristics, including robustness to system inaccuracies, ink consumption, and accessible gamut. Applying the transformation for a given R,G,B triplet involves finding the points in the LUT that form the smallest tetrahedron enclosing it, and doing a tetrahedral interpolation of their values. This is a computationally expensive operation.

The halftoning defines the pattern of dots on the medium and therefore has a large impact on image quality. This pattern is also affected by printer behavior. This is achieved using one of two families of algorithms: error diffusion, or point-to-point comparison with a threshold matrix. The error diffusion approach usually gives higher quality, but until pinwheel error diffusion was described it was not parallelizable, and therefore limited in its ability to exploit multi-core processing systems. It is also hard to control. Different dot pattern textures might be required for different printer configurations, and changing error diffusion to achieve them is a practical solution.

The threshold matrix approach to halftoning can provide very good quality, and at the same time is easy to parallelize and to control. The software pipeline may be used to implement the HANS pipeline with matrix halftoning, or a conventional pipeline. The HANS pipeline differs from a conventional one in that the output of the color transformation are not the levels for each ink, but a vector of required statistics for each Neugebauer Primary. A Neugebauer Primary NP is a combination of inks on the medium: for example, two layers of cyan on top of a layer of magenta. The color transformation in HANS specifies the mapping from R,G,B colors to vectors $(\alpha\_1, \ldots, \alpha\_n)$, where $\alpha\_i$ is the fraction of the medium that should be covered by each of the possible N_i primaries, that is the weighting for each color in the second color space, and $$\sum_{i=1}^{n} \alpha\_i = 1$$ (i.e., the weights of all primaries add up to 1).

The halftoning is then made by comparing, 305, the target statistics for each N at a given point, in the form of an ordered vector $\alpha\_i$, with a threshold value, t provided by a matrix. The Neugebauer Primary N_k that is selected, 305, for printing corresponds to the first k for which $$\sum_{i=0}^{k} \alpha\_i > t$$

As a result, the selection can be made using look-up tables, and eliminating the need to interpolate.

Not having to interpolate makes color transformations radically faster, essentially reducing the color transformation to building the pointer to the LUT and potentially a single look-up operation. This also makes it possible to create mappings between input and output spaces that do not depend on a linear interpolation.

In an example, for a HANS pipeline, all the possible Neugebauer Primaries are taken into account. This is rather high (for example, if a printer has four inks and puts up to two drops per ink this number is 81). The 81 N_i primaries are represented by an 8 bit identifier and their weight $\alpha\_i$ by 8 bit values. A desired ink-vector of Neugebauer Primaries is represented by a set of elements, a set of 16-bit pairs N_k:

$$\sum_{i=0}^{k} \alpha\_i,$$

for those N_k whose $\alpha\_k>0$.

These are stored in a first look-up table for only the non-zero elements N_k to provide a compact representation.

The first look-up table comprises a 1-D array that contains all the $256^3$ vectors of Neugebauer primaries in the system, represented as correlative 16-bit N_k:

$$\sum_{i=0}^{k} \alpha\_i$$

pairs. The 8 left-most bits of each element comprises the ink-vector identifier and the 8 right-most bits comprise the accumulated weight. Its size is $256^3$ times the average number of non-zero $\alpha\_i$ times 16 bits, which amounts to 233 Mebibyte (MiB) in the example mentioned above.

A second look-up table is provided. The second look-up table comprises a 1-D array indexed by a 24-bit representation of all the R,G,B values, and containing 32-bit pointers to the position in the first look-up table where the vector corresponding to each R,G,B value starts. Its size is 134 MiB. This gives a total of 367 MiB in memory, which is manageable without a significant investment in RAM.

Figure 4:
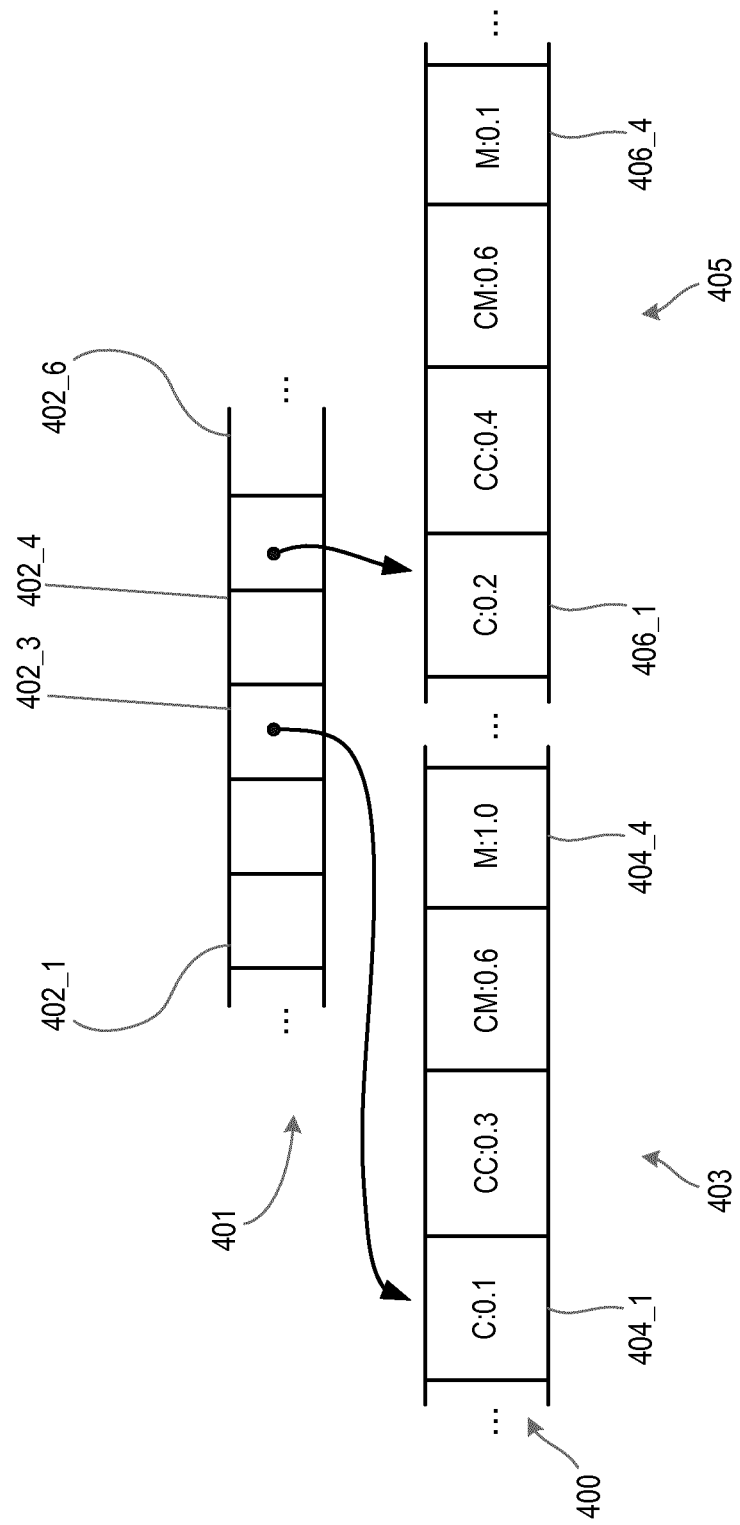
FIG. 4 is an illustration of an example of look-up table entries.

As illustrated in FIG. 4, the first look-up table 400 comprises a plurality of entries 403, 405. Although only 2 entries are illustrated here, the first look-up table 400 comprises $256^3$ vectors of Neugebauer Primaries. Each entry comprises a plurality of elements 404_1 to 404_4 and 406_1 to 406_4. For illustrative purposes only, FIG. 4 shows 4 elements. It will be appreciated that this is not limiting and each ink-vector may include any number of elements as necessary.

Figure 6:
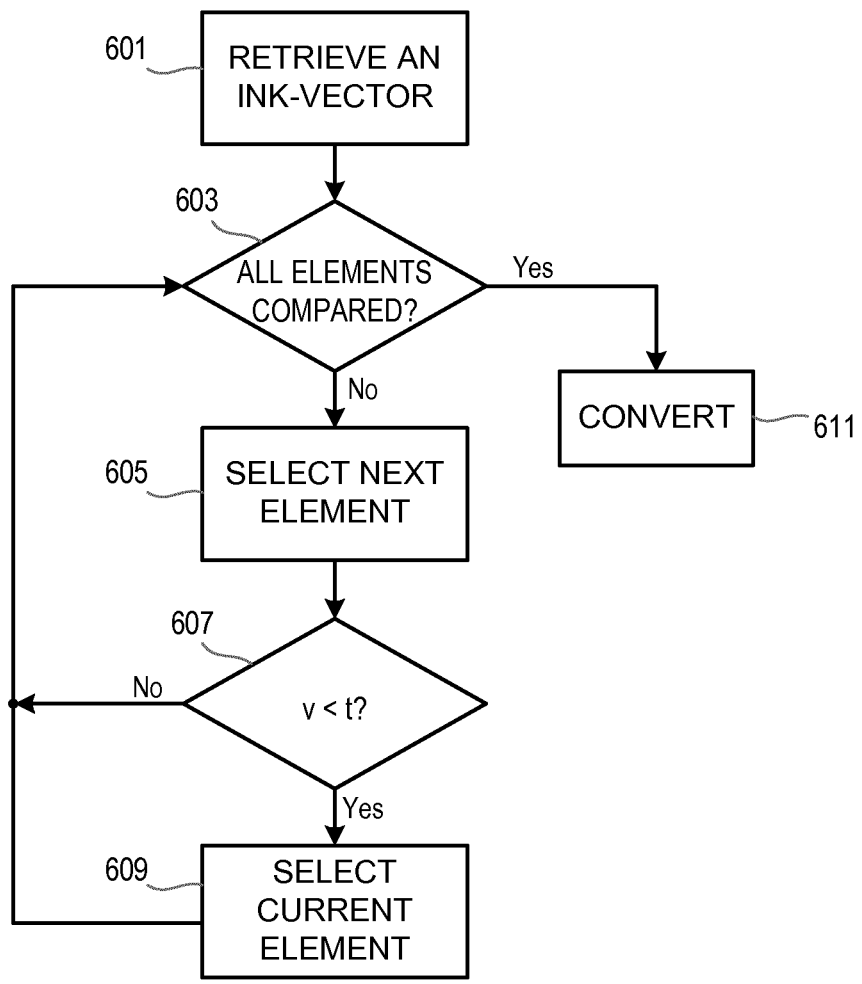
FIG. 6 is a flowchart of a method of processing a color image data of another example.

The second look-up table 401 comprises a plurality of entries 402_1 to 402_6 of 24-bit representation of all the R,G,B values and corresponding index or pointer. Again for illustrative purposes only. FIGS. 4 and 6 show 6 entries. Each entry of the second look-up table 401 comprises an index to an entry of the first look-up table 400. For example the first entry 402_3 of the second look-up table 401 indexes the first entry 403, for example, the starting element 404_1 of the first entry 403, and the second entry 402_4 of the second look-up table 401 indexes the second entry 405, for example, the starting element 406_1 of the second entry 405.

For example, starting with the value 404_1 at the index 402_3, the accumulated weight, the rightmost 8 bits of the values in the first table 400 is compared, 305, with the threshold t corresponding to the threshold value for the pixel defined by the halftoning matrix. The first element 404_1 to 404_4 whose accumulated value is greater than the threshold is retrieved, 307, by the selector 201. Its index from the 8 left-most bits, the identifier, is used by the mapper 205 as a pointer to a third LUT that gives the levels of each plane, i.e. the levels for each color of the second color space.

The example described above is with reference to HANS. However, it could equally be applicable to any other traditional pipeline. This may be achieved by storing four 8-bit values for each R,G,B entry, and then performing a direct comparison with a threshold for each color of the second color space (e.g. for each ink, e.g. four thresholds) as shown for example in FIGS. 5 and 6.

Figure 5:
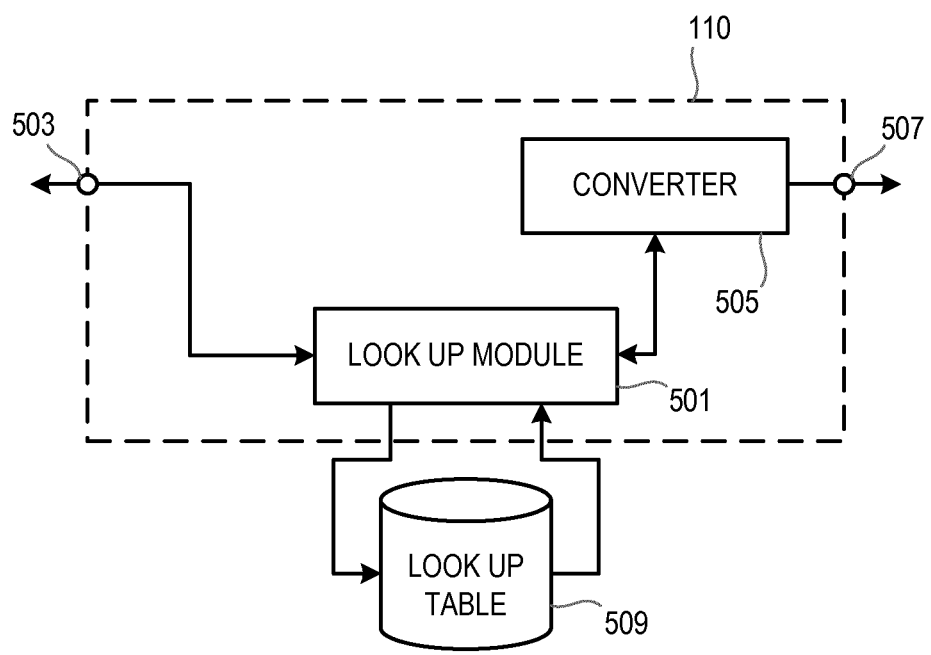
FIG. 5 is a simplified schematic diagram of an apparatus for processing a color image data according to another example.

The apparatus 110 for processing a color input image may, alternatively, comprise a look-up module 501 as shown in FIG. 5. The look-up module 501 is connected to an input terminal 503 of the apparatus 110 and a converter 505. The output of the converter 505 is connected to an output terminal 507 of the apparatus 110. The look-up module 501 is connected to a storage device 509, storing a look-up table. The storage device 509 may be integral with the apparatus 110 or external thereto.

Operation of the apparatus 110 will now be described with reference to FIG. 6. An input color image 104 comprising a plurality of pixels, each having a colorimetry defined in a first color space, for example, RGB color space, is received by the look-up module 501 via the input terminal 503. The look-up module 501 is configured, for each pixel, to retrieve, 601, a device vector (e.g. an ink-vector) defined in a second color space, for example, CMYK color space, from a look-up table stored in the storage device 509 based on the colorimetry of the pixel. Each ink-vector comprises a plurality of elements. Each element of the retrieved ink-vector has a value, v, which is compared to a corresponding threshold value, t, 603, 605, 607. If the value, v, is less than its corresponding threshold, t, the element is selected, 609. Once all the element values have been compared to their corresponding threshold, 603, the selected elements are combined, 611, to form a converted pixel.

As a result, the printing device 108 will direct the image 104 to be printed upon a substrate 116 as dictated by the image processing apparatus 110. The substrate 116 may include, without limitation, any variety of paper (lightweight, heavyweight, coated, uncoated, paperboard, cardboard, etc.), films, foils, textiles, fabrics, or plastics.

It should be noted that while printing system 100 is described in the context of image processing in a computing environment, it is to be appreciated and understood that it can be employed in other contexts and environments involving other types of data processing without departing from the spirit and scope of the claimed subject matter.

Figure 7:
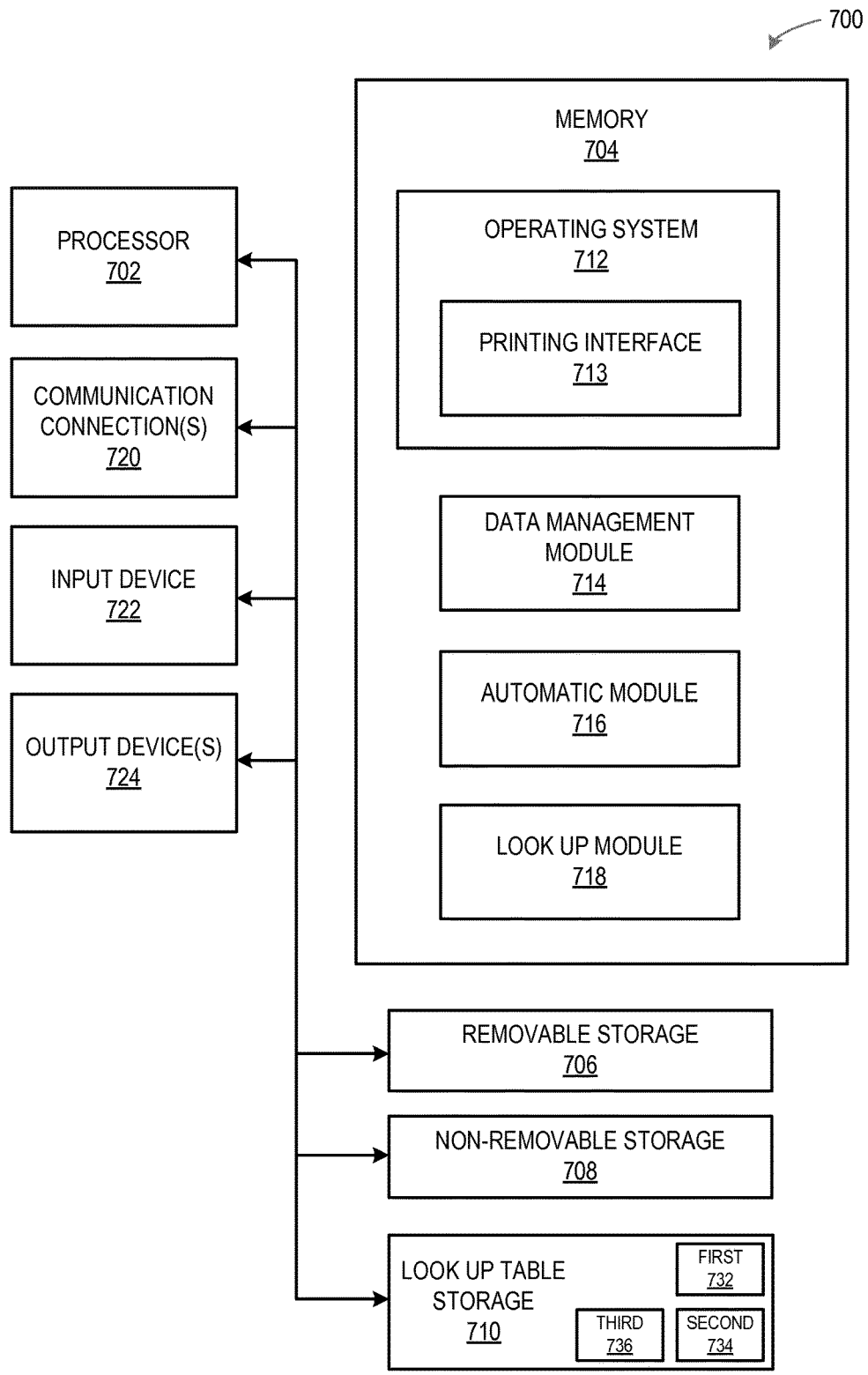
FIG. 7 is a block diagram of an example of a computing environment according to the printing system of FIG. 1.

FIG. 7 is a schematic block diagram of an exemplary general operating system 700. The system 700 may be configured as any suitable system capable of implementing interactive user interface 110 and associated color processes. In one exemplary configuration, the system comprises at least one processor 702 and a memory 704. The processing unit 702 may be implemented as appropriate in hardware, software, firmware, or combinations thereof. Software or firmware implementations of the processing unit 702 may include computer- or machine-executable instructions written in any suitable programming language to perform the various functions described.

Memory 704 may store programs of instructions that are loadable and executable on the processor 702, as well as data generated during the execution of these programs. Depending on the configuration and type of computing device, memory 704 may be volatile (such as RAM) and/or non-volatile (such as ROM, flash memory, etc.). The system may also include additional removable storage 706 and/or non-removable storage 708 and look-up storage 710 including, but not limited to, magnetic storage, optical disks, and/or tape storage. The disk drives and their associated computer-readable medium may provide non-volatile storage of computer readable instructions, data structures, program modules, and other data for the communication devices.

Memory 704, removable storage 706, and non-removable storage 708 and look-up storage 710 are all examples of the computer storage medium. Additional types of computer storage medium that may be present include, but are not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the computing device 102.

Turning to the contents of the memory 704 in more detail, may include an operating system 712 for the image processing apparatus. For example, the system 700 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 704 includes the printing interface 713, a data management module 714, and an automatic module 716 and a look-up module 718. The data management module 714 stores and manages storage of information, such as images, ROI, equations, and the like, and may communicate with one or more local and/or remote databases or services. The automatic module 716 allows the process to operate without human intervention. The look-up module 718 manages the look-ups of the first, second and third look-up tables 732, 734, 736 of the look-up storage 710.

Figure 3:
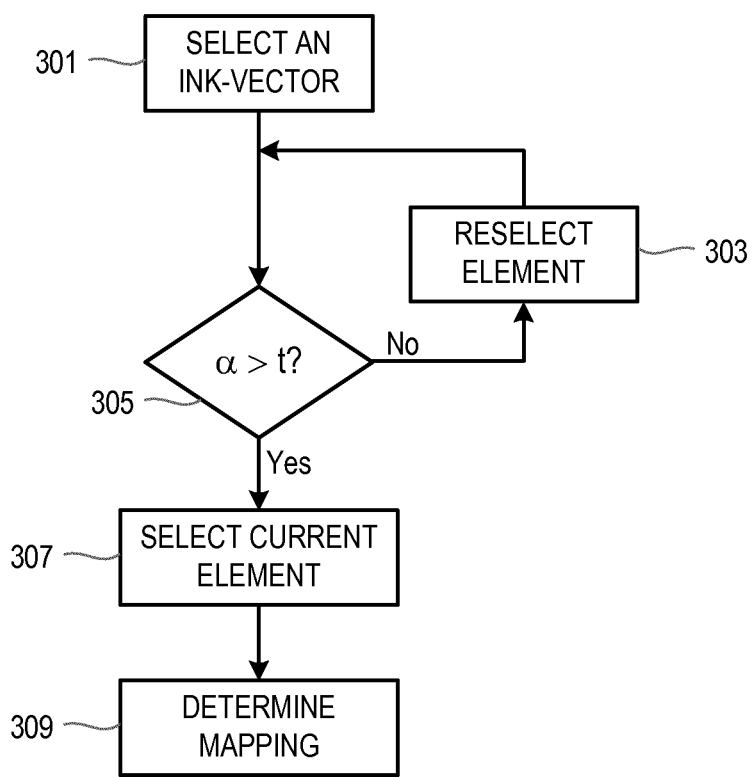
FIG. 3 is a flowchart of a method of processing a color image data of an example.

Although the look-up storage 710 illustrates the look-up tables of the example of FIGS. 2 to 4. It can be appreciated that the system of FIG. 7 is equally applicable to the example of FIGS. 5 and 6 in that the look-up storage 710 stores the look-up table of this example.

The system 700 may also contain communications connection(s) 720 that allow processor 702 to communicate with servers, the user terminals, and/or other devices on a network. Communications connection(s) 720 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 700 may also include input device(s) 722 such as a keyboard, mouse, pen, voice input device, touch input device, etc., and output device(s) 724, such as a display, speakers, printer, etc. The system 700 may include a database hosted on the processor 702. All these devices are well known in the art and need not be discussed at length here.

As a result, flexibility is provided making it possible to tweak the processing algorithms well into the printer's development cycle.

This provides printers with the flexibility of a software-based pipeline without the extra cost of high-end servers. With respect to the alternative of running the pipeline on a high-end server this is much cheaper to deploy. With respect to the alternative of running it in an ASIC or an FPGA, it is cheaper and faster to develop and more flexible.

Although various examples have been illustrated in the accompanying drawings and described in the foregoing detailed description, it will be understood that the invention is not limited to the examples disclosed, but is capable of numerous modifications without departing from the scope of the invention as set out in the following claims.

The invention claimed is:

1. A method comprising:
for each pixel of a plurality of pixels of a color image having colorimetry defined in a first color space:
selecting, by an image processing apparatus, a device-vector defined in a second color space based on the colorimetry of the pixel, the device-vector comprising a plurality of elements, each element including an identifier and an accumulated weighting;
reselecting, by the image processing apparatus, an element of the selected device-vector until the accumulated weighting of the currently selected element is greater than a threshold value associated with the pixel;
determining, by the image processing apparatus, the levels for each color of the second color space for the currently selected element of the selected device-vector to convert the pixel into a renderable pixel of a plurality of pixels of a renderable image defined by the device-vector.

2. The method of claim 1, wherein selecting a device-vector comprises:
locating an entry of a device-vector in a first look-up table based on an index associated with the colorimetry of the pixel, each entry of the first look-up table comprising the elements of each device-vector including an identifier and an accumulated weighting.

3. The method of claim 2, wherein reselecting an element of the selected device-vector comprises selecting the next entry in the first look-up table until the accumulated weighting of the current entry is greater than a threshold value associated with the pixel.

4. The method of claim 2, wherein selecting a device-vector further comprises
locating an entry of the index in a second look-up table based on the colorimetry of the pixel.

5. The method of claim 2, wherein the accumulated weighting of each entry of the first look-up table includes elements having nonzero weightings only.

6. The method of claim 1, wherein the step of determining the levels for each color of the second color space for the currently selected element comprises
locating an entry in a third look-up table based on the identifier of the currently selected element of the selected device vector, each entry of the third look-up table comprising individual levels for each color of the second color space of each element of each device-vector.

7. The method of claim 1, wherein the threshold is defined for each pixel in a halftoning matrix.

8. The method of claim 1, wherein the renderable image is rendered and output.

9. The method of claim 1, wherein the renderable image is rendered and printed.

10. The method of claim 1, further comprising:
outputting, by the image processing apparatus, the color image by transmitting the renderable image to an output device that renders and outputs the renderable image.

11. The method of claim 10, wherein outputting the color image comprises printing the renderable color image by transmitting the renderable image to a printing device that renders and prints the renderable image.

12. The method of claim 1, further comprising:
printing, by the image processing apparatus, the color image by transmitting the renderable image to a printing device that renders and prints the renderable image.

13. Apparatus for processing a color image into a renderable image, the color image comprising a plurality of pixels, each pixel having colorimetry defined in a first color space and the renderable image comprising a plurality of renderable pixels defined by a device-vector in a second color space, the apparatus comprising:
a selector configured to select a device-vector defined in the second color space based on the colorimetry of the pixel, the device-vector comprising a plurality of elements, each element including an identifier and an accumulated weighting, the selector is further configured to reselect an element of the selected device-vector until the device-vector accumulated weighting of the currently selected element is greater than a threshold value associated with the pixel; and
a mapper configured to determine the individual levels for each color of the second color space for the currently selected element of the selected device-vector to convert the pixel into a renderable pixel.

14. Apparatus of claim 13, wherein the selector is configured to locate an entry of a device-vector in a first look-up table based on a index associated with the colorimetry of the pixel, each entry of the first look-up table comprising the elements of each device-vector including an identifier and an accumulated weighting.

15. Apparatus of claim 14, wherein the selector is further configured to reselect the next entry in the first look-up table until the accumulated weighting of the current entry is greater than a threshold value associated with the pixel.

16. Apparatus of claim 14, wherein the selector is further configured to locate an entry of the index in a second look-up table based on the colorimetry of the pixel.

17. Apparatus of claim 14, wherein the accumulated weighting of each entry of the first look-up table includes elements having nonzero weightings only.

18. Apparatus of claim 13, wherein the mapper is further configured to locate an entry in a third look-up table based on the device-vector identifier of the currently selected device-vector, each entry of the third look-up table comprising the levels of each color of the second color space of each element of each device-vector identifier.

19. Apparatus of claim 13, wherein the apparatus further comprises a halftoning module for defining the threshold for each pixel.

20. A method of printing a color image, the method comprising:
processing a color image into a printable image, the color image comprising a plurality of pixels, each pixel having colorimetry defined in a first color space and the printable image comprising a plurality of printable dots defined by an ink-vector in a second color space, processing comprising the steps of:

for each pixel:
- selecting an ink-vector defined in the second color space based on the colorimetry of the pixel, the ink-vector comprising a plurality of elements, each element including an identifier and an accumulated weighting;
- reselecting an element of the selected ink-vector until the accumulated weighting of the currently selected element is greater than a threshold value associated with the pixel;
- determining the levels for each color of the second color space for the currently selected ink-vector to convert the pixel into a printable dot; and printing the color image with the printable dots.

* * * * *